Feb. 2, 1960 M. SALTER 2,923,889

ELECTRONIC INTEGRATING CIRCUITS

Filed Sept. 8, 1954

INVENTOR
MICHAEL SALTER

BY [signature]
ATTORNEY

United States Patent Office 2,923,889

Patented Feb. 2, 1960

2,923,889

ELECTRONIC INTEGRATING CIRCUITS

Michael Salter, Stanmore, England, assignor to The General Electric Company Limited, London, England Application September 8, 1954, Serial No. 454,752

Claims priority, application Great Britain September 9, 1953

6 Claims. (Cl. 331—17)

The present invention relates to electric devices of a kind arranged to produce in operation a smoothed voltage varying in dependence upon the amplitude of a pulsed input signal.

It is an object of the present invention to provide an improved electric device of the kind specified, in which the gain, that is the variation of amplitude of the output voltage compared with the variation in amplitude of the pulsed input signal, is increased relative to that of known devices of a similar nature.

According to the present invention an electric device of the kind specified comprises a clamping circuit, a path for supplying the pulsed input signal to the clamping circuit, a storage circuit which is arranged to be supplied by the said path through the clamping circuit, and a direct-coupled feedback path which is connected between the output of the storage circuit and the input of the clamping circuit, the clamping circuit being arranged to be operated coincident in time with the pulses of the pulsed input signal, or at the time positions at which the pulses of said input signal would appear when the amplitude thereof is reduced to zero, while the feedback path is arranged so that a proportion of the voltage which is supplied by the storage circuit and which constitutes the output voltage of the device is fed to the input of the clamping circuit in a sense to add to the input voltage from which it is derived.

A system for the automatic frequency control of an oscillator which includes a device in accordance with the present invention will now be described by way of example with reference to the two figures of the accompanying drawing in which—

Figures 1, 2:
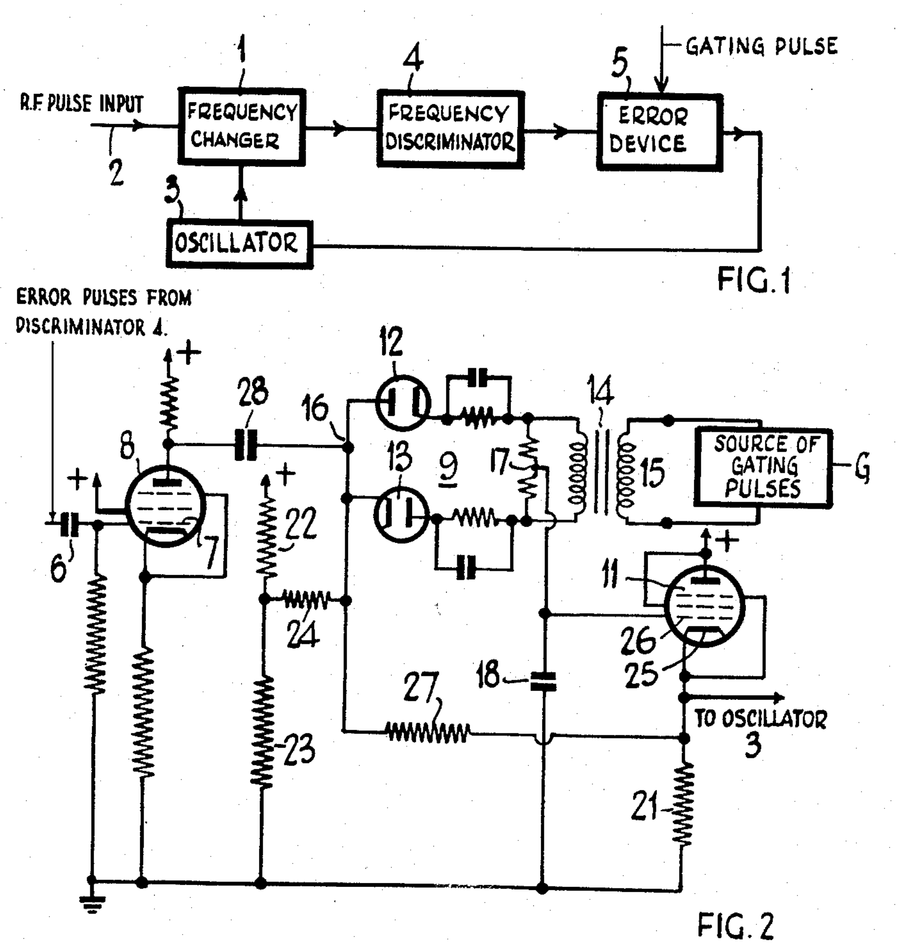
Figure 1 shows a block diagram of the frequency control system.
Figure 2 shows in more detail the circuit of the error device of Figure 1.

Referring to Figure 1, the automatic frequency control system comprises a frequency changer 1 which is arranged to heterodyne regularly recurrent pulses of radio frequency energy supplied over a path 2 with an oscillation supplied by an oscillator 3. The radio frequency pulse input supplied over the path 2 may be provided by a pulsed oscillator (not shown) or may be received over a radio link. The intermediate frequency signal supplied by the frequency changer 1 is fed to a frequency discriminator 4 which may be of the Foster-Seeley type, the crossover frequency of this discriminator 4 being equal to the required frequency of the intermediate frequency signal. The output from the frequency discriminator 4 thus consists of a train of pulses which may be either positive- or negative-going and the amplitude of which is proportional to the frequency deviation of the intermediate frequency signal from its desired frequency. This train of error pulses is supplied to an error device 5 which is arranged to provide a smoothed output voltage that is fed to the oscillator 3 for the purpose of controlling its operating frequency and thereby tending to reduce the said frequency deviation of the intermediate frequency signal.

The error device 5 is designed to produce a smoothed output voltage which on the occurrence of a radio frequency input pulse is adjusted to a level dependent upon the amplitude of the resulting error pulse supplied to the device 5 and to hold the output voltage substantially constant at that level until the occurrence of the next pulse. The frequency correction produced by the automatic frequency control system thus occurs only during each radio frequency pulse after which the frequency of the oscillator 3 remains substantially constant until the next pulse.

Referring now also to Figure 2, the train of error pulses supplied by the frequency discriminator 4 is fed through a capacitor 6 to a control grid 7 of a pentode thermionic valve 8. The valve 8 is resistance-capacitance coupled through a clamping circuit 9 to the input circuit of a pentode thermionic valve 11 which is arranged to operate as a cathode follower stage.

The clamping circuit 9 is of known form and comprises a pair of biased diode thermionic valves 12 and 13 and a pulse transformer 14, gating pulses being arranged to be supplied to the winding 15 of the transformer 14 from a source G so that the clamping circuit 9 is conducting during each error pulse. At other times, the input and output terminals 16 and 17 of the clamping circuit 9 are isolated from one another so far as connection through the clamping circuit 9 is concerned. The output terminal 17 of the clamping circuit 9 is connected to one side of a capacitor 18, the other side of which is connected to earth. The voltage developed across the capacitor 18 is supplied to the cathode follower stage formed by the valve 11 and the voltage produced across the resistor 21 in the cathode circuit of this valve is utilised to control the operating frequency of the oscillator 3.

Since the control voltage supplied to the oscillator 3 is required to have a predetermined value in the region of 70 volts when the oscillator 3 is correctly tuned and to have a greater or lesser value when the oscillator frequency is to be increased or reduced, the input terminal 16 of the clamping circuit 9 is arranged to be biased by means of a network formed by the resistors 22, 23 and 24. In addition, to provide the feed-back path which is an essential feature of a device in accordance with the present invention, a resistor 27 is connected between the cathode 25 of the valve 11 and the input terminal 16.

The operation of the error device 5 will now be considered. The pulses supplied to the winding 15 of the pulse transformer 14 are coincident in time with the error pulses supplied by the frequency discriminator 4. The clamping circuit 9 thus acts as a switch which is closed on each occasion that an error pulse may arrive. On each occasion that the clamping circuit 9 operates, the potential at its output terminal 17, and, therefore, across the capacitor 18, is clamped to the potential at its input terminal 16. If there were no feed-back path, that is to say if the resistor 27 were to be omitted, and in the absence of an error pulses, the output terminal 17, that is to say the control grid 26 of the valve 11, would be clamped to the potential determined by the network formed by the resistors 22, 23 and 24 on each occasion that the clamping circuit 9 is operated. In this connection, it will be appreciated that the clamping circuit 9 continues to operate at each of the time positions at which an error pulse may appear, even if the error pulse amplitude has become zero either owing to the oscillator 3 being at the required frequency or there being no radio frequency pulse supplied over the path 2. The use of the gating pulses supplied by the source G insures this, and thereby also insures a good sensitivity for the circuit since the clamping circuit 9 is operated in a definite manner during each error pulse irrespective of the amplitude of that pulse.

In the present example however, a resistor 27 say of value $R_1$, is connected between the cathode 25 of the valve 11 and the input terminal 16 of the clamping circuit 9. If now the value of the resistance connected between the input terminal 16 and earth is considered as $R_2$, the potential of the terminal 16 (neglecting for the moment the bias applied to the terminal 16) when the error pulse amplitude is zero will be $R_2/(R_1+R_2)$ of the cathode potential of the valve 11. Thus the grid 26 will then be clamped to a potential equal to $R_2/(R_1+R_2)$ of the potential of the cathode 25 on each occasion when the clamping circuit 9 operates. In theory the potential of the grid 26 should remain constant in the intervals between pulses, but in practise a small leakage will occur resulting in a slight re-adjustment of the potential on each occasion of operating the clamping circuit 9.

Let now the negative bias on the grid 26 relative to the cathode 25 required to maintain the cathode 25 at a potential $y$ volts above earth be $x$ volts. In addition let the potential at the input terminal 16 relative to earth be $z$ volts and the voltage across the resistor 23 be $v$ when there is no current flowing through the resistor 24. Under the operating conditions discussed above in which the error pulses are of zero amplitude, it follows that:

$$\begin{aligned} z &= y-x \\ &= yR_2/(R_1+R_2)+vR_1/(R_1+R_2) \end{aligned}$$

and therefore $$y = x.\frac{R_1+R_2}{R_1}+v$$

Suppose now $y$ has to be increased by a small amount $\epsilon$ volts to effect an adjustment of the frequency of the oscillator 3. To a first approximation $x$ remains constant, so that $z$ must also be increased by $\epsilon$ volts to produce a change in $y$. However, owing to the inclusion of the feedback path, an increase of $\epsilon$ in $y$ will produce an increase in $z$ of $\epsilon R_2/(R_1+R_2)$. In order to produce an increase in $y$ of $\epsilon$, therefore, the necessary error pulse amplitude E will be given by:

$$\begin{aligned} E &= \epsilon-\epsilon R_2/(R_1+R_2) \\ &= \epsilon R_1/(R_1+R_2) \end{aligned}$$

If the feedback circuit were not included the error pulse amplitude E would have to be $\epsilon$. It will be seen therefore that the provision of the feedback path increases the sensitivity or gain of the error device 5 by the factor $(R_1+R_2)/R_1$. By proportioning the resistors 22, 23, 24 and 27 accordingly, this increase may be made quite large. For example, to give a gain of approximately 4.4, these resistors may have the following values:

| | Ohms |
|---|---|
| Resistor **22** | 33,000 |
| Resistor **23** | 22,000 |
| Resistor **24** | 100,000 |
| Resistor **27** | 33,000 |

The response of the device 5 during any single error pulse is unaffected by the presence of the feedback path provided by the resistor 27, since the potentials at the input terminal 16 of the clamping circuit 9 and the cathode 25 of the valve 11 will always vary together so long as the clamping circuit 9 is operated, and there is therefore no change in the current flow through the feedback path resistor 27 as long as the clamping circuit 9 is operated. The response of the device 5 to a series of error pulses is modified by the presence of the feedback path, the upper frequency limit of such modification being determined by the time constant associated with the charging of the capacitor 28 through the feedback path.

Speaking loosely, the effect of introducing the feedback path may be said to be increasing the gain of the device 5 for low frequencies without appreciably affecting the gain at high frequencies.

I claim:

1. An electric device of the kind arranged to produce a smoothed voltage the amplitude of which varies in dependence upon the amplitude and sense of input voltage signals applied thereto during spaced periods of time, comprising: an input terminal; means to apply input voltage signals to said input terminal; an output terminal; clamping means operable by a gating pulse applied to its output to apply a voltage signal to the output terminal that is dependent in amplitude and sense upon the voltage signal at the input terminal, said clamping means comprising two unidirectional current paths connected in shunt and in opposition to interconnect the input and the the output terminals; means for applying a gating pulse to a circuit containing the output terminal so that the pulse is applied concurrently to the outputs of both said unidirectional current paths during each of said spaced periods to operate said clamping means; storage means connected to the output terminal to maintain the voltage at said output terminal substantially constant when the clamping means is inoperative at the amplitude prevailing when the clamping means was last previously operative; and a direct-coupled positive feedback path to apply a voltage signal to said input terminal the amplitude of which is dependent upon the amplitude of the voltage at said output terminal so as to increase the apparent amplitude to the unidirectional current paths of the input voltage signals.

2. An electric device of the kind arranged to produce a smoothed voltage the amplitude of which varies in dependence upon the amplitude and sense of input voltage signals applied thereto during a regularly recurring interval of time, comprising: an input terminal; means to apply input voltage signals to the input terminal; an output terminal; a capacitance connected to the output terminal; clamping means interconnecting the input terminal and the capacitance and operable by a gating pulse applied to its output to apply a voltage signal to the output terminal that is dependent in amplitude and sense upon the voltage signal at said input terminal, said clamping means comprising two rectifiers, means connecting both of said rectifiers to said input terminal and to said output terminal with said rectifiers in shunt and in opposition between said input terminal and said output terminal, and means to reverse bias the rectifiers; means for applying a gating pulse to a circuit containing the output terminal so that said pulse is applied concurrently to the outputs of both said rectifiers during each said interval to concurrently oppose the reverse bias applied to said rectifiers and thereby operate said clamping means, said storage means maintaining the voltage at said output terminal substantially constant when the clamping means is inoperative at the amplitude prevailing when the clamping means was last previously operative; a cathode follower stage having an input connected to the capacitance and an output constituting the output of said device; and a resistance interconnecting the output of the cathode follower stage and said input terminal to provide a direct-coupled positive feedback path between that output and the input terminal to apply a voltage signal to said input terminal the amplitude of which is dependent upon the amplitude of the voltage at the output terminal so as to increase the apparent amplitude to the rectifiers of the input voltage signals.

3. An electric device as set forth in claim 1 wherein the feedback path is formed by a resistance connected between the output terminal and the input terminal.

4. An electric device as set forth in claim 1 wherein the switching means includes a cathode follower stage having an input terminal connected to the output terminal, the cathode follower stage having an output, the feedback path being connected between the output of the cathode follower stage and the input terminal.

5. An electric device as set forth in claim 4 wherein the storage means is a capacitor.

6. A system for controlling the frequency of an oscillator in dependence upon the amplitude and sense of input voltage signals occurring at spaced periods of time, comprising, an input terminal, means to apply the input voltage signals to the input terminal, an output terminal, clamping means operable by a gating pulse applied to its output to apply a voltage signal to said output terminal which is dependent in amplitude and sense upon the amplitude and sense of the voltage signal at that time applied to said input terminal, said clamping means comprising two unidirectional current paths connected in shunt and in operation to interconnect the input and the output terminals, means for applying a gating pulse to a circuit containing the output terminal so that said pulse is applied concurrently to the outputs of both said unidirectional current paths during each of said spaced periods to operate said clamping means, storage means connnected to said output terminal to maintain the voltage at said output terminal substantially constant when the clamping means is inoperative at the amplitude prevailing when the clamping means was last previously operative, a direct-coupled positive feedback path to apply a voltage signal to said input terminal the amplitude of which is dependent upon the amplitude of the voltage signal at said output terminal so as to increase the apparent amplitude to the unidirectional current paths of the input voltage signals, and means coupling said output terminal to the oscillator to control the frequency of said oscillator in dependence upon the amplitude of the voltage signal at said output terminal.

References Cited in the file of this patent

UNITED STATES PATENTS

| | | |
|---|---|---|
| 2,251,851 | Moore | Aug. 5, 1941 |
| 2,406,978 | Wendt et al. | Sept. 3, 1946 |
| 2,497,693 | Shea | Feb. 14, 1950 |
| 2,503,700 | Barco | Apr. 11, 1950 |
| 2,540,820 | Gruen | Feb. 6, 1951 |
| 2,542,160 | Stoner et al. | Feb. 20, 1951 |
| 2,565,896 | Webb | Aug. 28, 1951 |
| 2,602,896 | Whitaker | July 8, 1952 |
| 2,683,803 | Keizer | July 13, 1954 |
| 2,683,806 | Moody | July 13, 1954 |
| 2,701,303 | Wells | Feb. 1, 1955 |
| 2,730,622 | Janssen | Jan. 10, 1956 |
| 2,761,972 | Fathauer | Sept. 4, 1956 |
| 2,772,358 | Keen | Nov. 27, 1956 |

OTHER REFERENCES

"Waveforms" by Chance et al., vol. 19, Rad. Lab. Series, published by McGraw-Hill, 1949 edition, pages 524–529.